United States Patent [19]
Saito et al.

[11] Patent Number: 5,898,607
[45] Date of Patent: Apr. 27, 1999

[54] RECORDING/REPRODUCING METHOD AND RECORDING/REPRODUCING APPARATUS

[75] Inventors: Toshiro Saito; Shigeo Suzuki, both of Hitachi; Masato Isogai, Mito, all of Japan

[73] Assignee: Hitachi, Ltd., Tokyo, Japan

[21] Appl. No.: 08/866,307

[22] Filed: May 30, 1997

Related U.S. Application Data

[63] Continuation-in-part of application No. 08/780,109, Dec. 26, 1996, abandoned, which is a continuation of application No. 08/523,861, Sep. 6, 1995, abandoned.

[30] Foreign Application Priority Data

Sep. 14, 1994 [JP] Japan ................................. 6-219811

[51] Int. Cl.$^6$ .................................................. G11C 13/00
[52] U.S. Cl. .......................................... 365/106; 365/112
[58] Field of Search ...................... 365/106, 112

[56] References Cited

U.S. PATENT DOCUMENTS

| | | | |
|---|---|---|---|
| 3,752,667 | 8/1973 | D'Onofrio | 430/97 |
| 3,932,025 | 1/1976 | Lakatos et al. | 430/20 |
| 4,778,985 | 10/1988 | Modisette et al. | 250/214 LA |

*Primary Examiner*—David Nelms
*Assistant Examiner*—Hoai V. Hu
*Attorney, Agent, or Firm*—Kenyon & Kenyon

[57] ABSTRACT

A voltage of an intensity corresponding to information to be recorded is applied to a recording medium which comprises a film containing a charge generating material. The film is sandwiched between two electrodes. Electric charges are accumulated in the recording medium upon application of the voltage so that information is recorded. When light is irradiated to the recording medium, the stored charges are converted into photo-current. The recorded information is read out by detecting the photo-current. When the electrodes are short-circuited, the recorded information is erased.

3 Claims, 5 Drawing Sheets

FIG. 1

(1) RECORDING  (2) REPRODUCING  (3) ERASING

RECORDING/REPRODUCING METHOD AND RECORDING/REPRODUCING APPARATUS

CROSS-REFERENCE TO RELATED APPLICATIONS

This application is a continuation-in-part of application Ser. No. 08/780,109, filed on Dec. 26, 1996 abandoned, which is a continuation of application Ser. No. 08/523,861, filed on Sep. 6, 1995 abandoned, both of which are incorporated by reference herein.

FIELD OF THE INVENTION

The present invention is related to a recording/reproducing method and a recording/reproducing apparatus using it, wherein information is recorded with electric signals and recording is reproduced by irradiating light on a recording medium. The present invention can be utilized for recording and reproducing in the field of computers and for recording and reproducing in the field of image information

DESCRIPTION OF THE PRIOR ART

There has been proposed a recording method in which recording conditions are detected by changes of electric potential. For example, the following recording method is described in Japanese patent laid-open print No. 2-96949 bulletin. Light is irradiated on a transparent electrode and a second electrode while a constant voltage is applied there between of the element. The element comprises a transparent substrate, a transparent electrode, a photoconductive electrode, a first electrode, a solid electrolyte and a second electrode. Recording of signals is carried out by changing the voltages generated at the voltage memory part consisting of the first electrode, solid electrolyte and the second electrode.

In order to reproduce the recorded information, the voltage which is generated at the voltage memory part is detected while irradiating the element with light to read out the information. There is a problem that it has a slow recovery speed of erasing recorded information, because the solid electrolyte forms intercalation with the first electrode material, i.e. a chemical reaction. According to the prior art mentioned above, erasure of the information is carried out by applying a predetermined voltage to the recording medium, while irradiating the recording a medium with light. This erasing step requires a long time.

SUMMARY OF THE INVENTION

An object of the present invention is to provide a new recording/reproducing method and a recording/reproducing apparatus by which either an analog signal or a digital signal can be recorded and reproduced.

The construction of the recording and reproducing method of the present invention is as follows.

The first feature of the invention is described as follows:

A voltage corresponding to information to be recorded is applied to a material film having a function for photoelectric conversion, whereby an amount of charges corresponding to the recording information is accumulated in the charge generating film thereby to record the information. Subsequently, stored charges are converted into photocurrent upon irradiating the material film with light to generate photo-current in accordance with the recorded information. The information is reproduced by detecting an amount of the current.

The second feature of the present invention is described as follows.

Electric charges are accumulated in the recording medium to record information by applying voltage of an intensity corresponding to recording information to the recording medium whose film containing charge generating film is sandwiched between a pair of electrodes.

Subsequently, recorded information is reproduced by irradiating light to the recording medium and converting stored charges into photo-current. The electrodes are short-circuited to erase recording.

The third feature of the present invention is described as follows.

Charges corresponding to recorded information are accumulated in a recording medium to write in analog information on the recording medium by applying an electric field of an intensity corresponding to recorded information to the recording medium. Subsequently, light is irradiated to the recording medium, and stored charges are converted into photo-current. Recorded information corresponding to a quantity of charges accumulated in the recording medium is read as analog information by detection of the photo-current. A light intensity for reading out the information per one time is controlled so that a quantity of charges converted into electric current for one reading-out is set to be smaller than a quantity of charges accumulated in the recording medium at recording.

The recording/reproducing apparatus of the present invention comprises the following elements.

(1) Recording information input means;

(2) A recording medium in which a film having a function for photo-electric conversion is sandwiched between two electrodes;

(3) Means for irradiating light to the recording medium;

(4) Photo-current detection means which detects the photo-current in the recording medium upon light irradiation;

(5) Power supply means which applies voltage to the recording medium;

(6) Short-circuit means which removes the charges by short-circuiting the electrodes of the recording medium;

(7) The voltage control means which controls voltage of the power supply means in accordance with recording information;

(8) The output means which outputs the photo-current from the detection means;

(9) The switching means which connects the photo-current detection means and voltage control means to the recording medium at the time of reproduction.

Another recording/reproducing apparatus of the present invention comprises the following elements.

(1) Recording information input means;

(2) A recording medium which has a laminate of a film containing a charge generating material and a charge injection film, the laminate being sandwiched between two transparent electrodes;

(3) First light irradiation means that irradiates the charge injection film of the recording medium;

(4) Second light irradiation means which irradiates light to the film containing charge generation material of the recording medium;

(5) Photo-current detection means which detects photo current produced in the recording medium by light irradiation of the second light irradiation means;

(6) A power supply means which applies voltage to the first light irradiation means;

(7) Short-circuit means which removes the charges accumulated in the recording medium;

(8) Voltage control means which controls voltage of the power supply means by recording information;

(9) Output means which outputs the photo-current from the detection means;

(10) The switching means which connects the photo-current detection means and voltage control means to recording medium at the time of reproduction.

Figure 1:
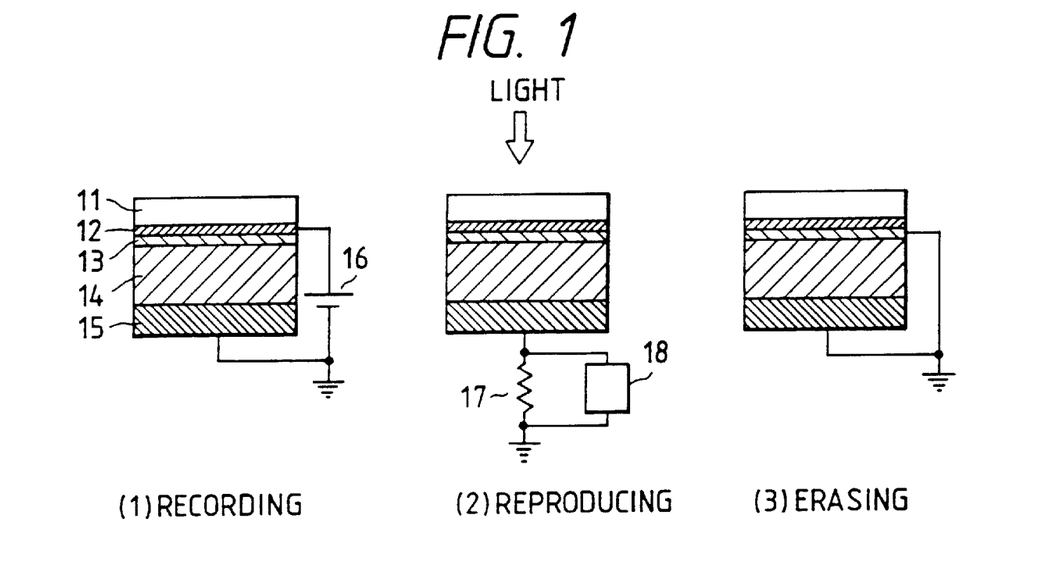
FIG. 1 is a drawing showing a construction of the recording/reproducing method of the present invention.
Figure 8:
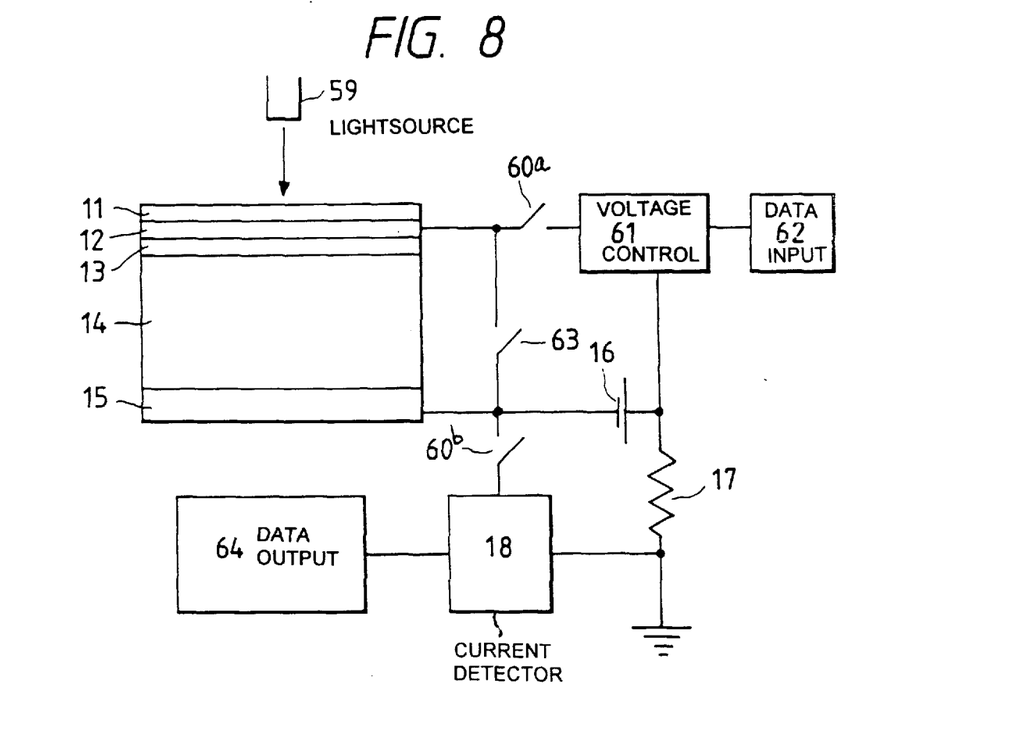
FIG. 8 is a drawing showing a construction of the recording/reproducing apparatus of the present invention.

Schematic diagrams of recording/reproducing method of the present invention are shown in FIG. 1 and FIG. 8. Inventors discovered the following facts.

1) When a voltage is applied to the thin film prepared by dispersing a charge generating material having an opto-electricity transform function in a polymer or a thin film made by vacuum deposition, there remain charges in a cell when a circuit is opened without returning the voltage to 0V.

2) When light is irradiated on the charge generating film, photo-current is observed repeatedly.

3) When electrodes are short-circuited, photo-current is not observed. If the condition in which charges are accumulated in a cell is considered as the recorded (or programmed) condition, a cell of a simple construction can be used as a recording medium. In the recording medium, a film of a charge generating material is sandwiched between electrodes.

A recording/reproducing method was discovered wherein information is written in this recording medium by applying voltage, light is irradiated to read out recorded information by detecting photo-current, and recording can be erased by short-circuiting electrodes of the recording medium. An amount of charge accumulated in the recording medium changes in accordance with an intensity of a voltage applied to the above recording medium.

Therefore, recording information can be written directly in the recording medium in analog form by applying voltages corresponding to recording information. Accordingly, compared with conventional methods wherein only zero or one in one place is recorded, the recording density of the recording medium of the present invention can be increased drastically.

The recording/reproducing method of the present invention records information by applying voltage to the recording medium so as to effect dielectric polarization. In other words, the condition where the recording medium is polarized is considered as a recorded state. The polarized state can be detected by measuring potential change (change in photo-current) generated at both ends of the recording medium to which light is irradiated.

If a voltage applied is changed according to recorded information so that polarization state changes, and photo current intensity changes, too. Accordingly, in the recording/reproducing method of the present invention, it is possible to record multiply (multiple states) on the single site, unlike the conventional methods in which only zero or one is recorded on one recording a site. If both ends of the recording medium are short-circuited to remove the polarization condition, recording can be erased.

Recording and reproducing is carried out by migration of charges. Accordingly, deterioration of recording medium by by-reaction produced with repetition of recording/reproduction is minimized.

As films containing the charge generating material to which the recording/reproducing method of the Present invention may be applied, there are the following examples.

A. Phthalocyanine series compounds
B. Azo pigments
C. Squalium compounds
D. Azulenium salt compounds
E. Perylene pigments
F. Quinacridone compounds
G. Quinone series compounds
H. Pyrylium salt compounds
I. Derivatives of the above compounds The above charge generating materials are ground into minute particles and they are dispersed in an appropriate binder resin to make a film, or an evaporated film of the above charge generating materials is used. And, a film of inorganic semiconductor materials such as selenium, silicon, etc. is desirable. A thickness of the film containing the charge generating material ranges from 0.05 to 10 $\mu$m, and preferably it ranges from 0.25 to 5 $\mu$m. When a film thickness is smaller than 0.05 $\mu$m, breakdown of the film takes place at an applied voltage of around 1 V. And, the film thickness which is larger than 10 $\mu$m is improper because a high applied voltage more than 200V is necessary to effect the polarization.

As an electrode used for the present invention, there are exemplified transparent electrodes such as ITO (indium-tin oxide) formed on a glass or polymer film substrate by evaporation or by coating, or electrodes of semi-transparent metal films such as aluminum, gold, etc. evaporated on a substrate. And, an isolation film such as silicon oxide, silicon nitride, polymer thin film is formed on the electrode so as to improve dielectric strength of recording medium.

A film containing a charges generating material is formed on above electrode by dip-coating method, spin coating method, spraying coating method or vacuum deposition method. By driving the counter electrode of needle form, voltage can be applied to each point of the thin film of charge generating material. And, when a counter electrode is a minute thin film electrode corresponding to each recording point, voltage is applied to each of the recording points.

Recording of signals is effected by applying voltage between electrodes of cells of the above recording medium, the voltage corresponding to the information, while the applied points are continuously changed. Light with a certain intensity is irradiated. to the recording medium whole and reproduction of recording signaling detects photo-current generated in each recording binary digit as voltage change through suitable inserted resistor. Or, as individual to each recording point and irradiation location is changed small light of beam diameter, is irradiated and photo-current generated in each recording point can be detected as voltage change through a suitable insertion resistor.

The present inventors examined recording elements with various kinds of photo-electric translation material zealously. As a result, when a voltage is applied to the cell in which the film containing a suitable charge generating material was sandwiched between two electrodes and a circuit was opened up in the condition that a voltage was applied and when light of wave length which the charge generating material absorbs was irradiated to the cell, photo-current was observed.

Furthermore, photo-current changed very little, even if light was irradiated repeatedly. And, the present inventors discovered that photo-current depended on the voltage intensity that was firstly applied to a cell.

When a film thickness is assumed with d, dielectric constant with $\epsilon\epsilon_0$, an overlapping area of the electrodes with A, an amount Q of charges accumulated in a cell to which voltage V is applied is expressed by equation 1).

$$Q = \epsilon \epsilon_0 A V / d \qquad \text{eq. 1)}$$

Binding charges remain on the electrode after having stopped application of voltage because the state of polarization of the cell is maintained. For this reason, the charge generating material continues to receive effect of an electric field which the binding charge makes. Subsequently, when light is irradiated, the charge generating material absorbs light to generate photo-current so that photo carriers are generated. When a quantity of charges of photo carries generated in one exposure is assumed with q, photo current is observed even if exposure is repeated until Q/q times. Accordingly, in the recording/reproducing method of the present invention, written information can be read out to the maximum Q/q times. For example, when information is written at 100V in a film of 5 $\mu$m thick in which Phthalocyanine minute particles are dispersed and it recorded information is read out with pulsed light of light intensity of approximately 10 $\mu$m J, reproduction of approximately $2 \times 10^4$ times could be carried out.

An amount of charges accumulated in the cell changes according to eq. 1, when a voltage applied in writing is changed. Upon light irradiation for reading out, intensity of the electric field applied to the charge generating material changes. Therefore, the amount of generated photo-carriers (i.e. intensity of photo-current) changes. Accordingly, in writing, by setting the applied voltage to an intensity corresponding to the recording information, analog recording to the cell which is a recording medium is carried out. With that purpose according to the recording/reproducing method of the present invention compared with the conventional methods, recording density can be increased.

Accordingly, a recording/reproducing apparatus of a simple construction can be provided by the recording/reproducing method of the present invention, in which a rewritable number is great and analog signals can be directly recorded in a recording medium. For example, information is recorded by applying voltages of intensities corresponding to the recording information as scanning the needle electrode which is very thin and is used for a scanning type tunnel microscope the surface of a film containing the charge generating material.

The film is sandwiched between transparent electrodes. Subsequently, in reading out information, light which the charge generating material absorbs is irradiated from the transparent electrode side, photo-current flowing through the resistor which is inserted between the transparent electrode and earth is detected, and recording information can be reproduced from the intensity of photo-current.

Figure 9:
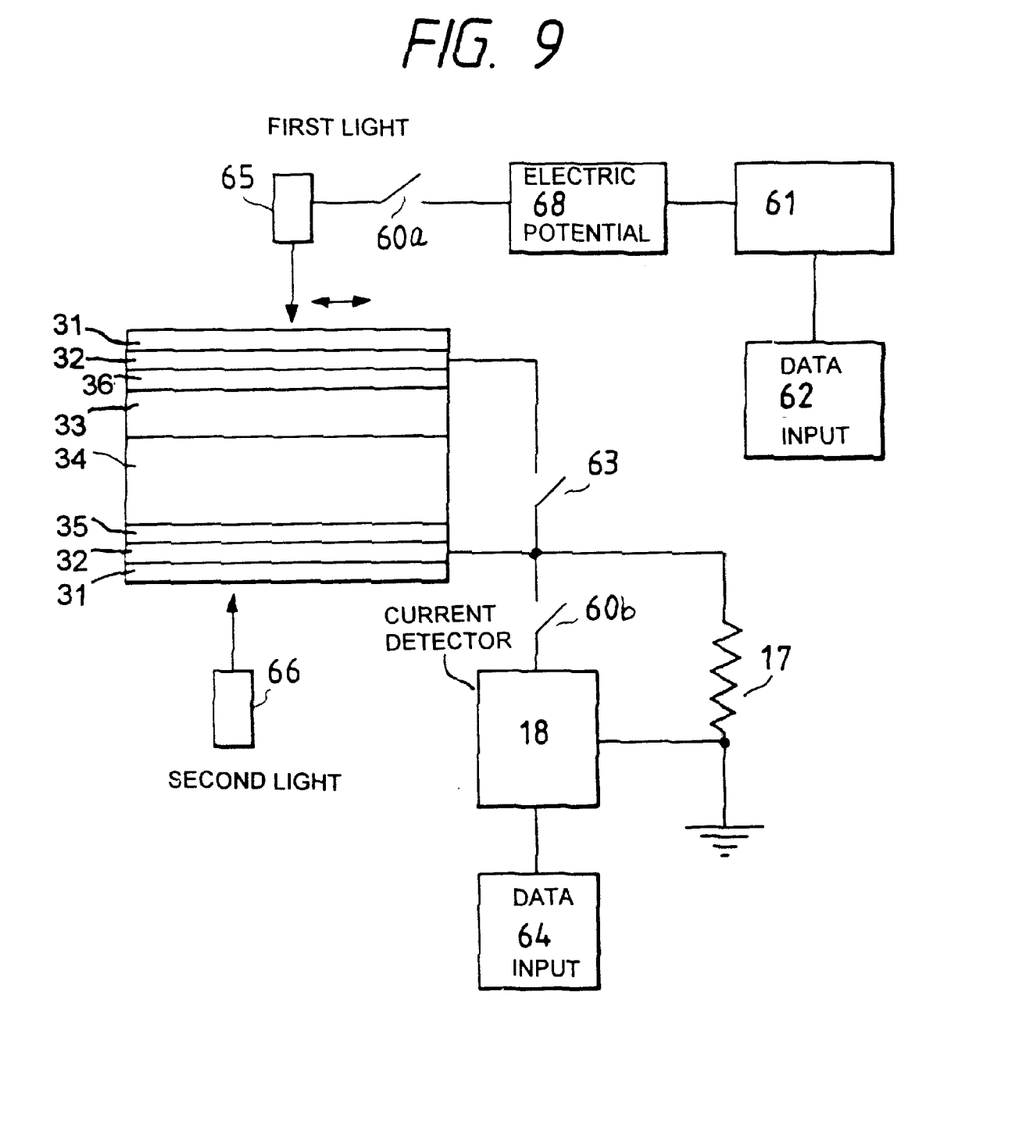
FIG. 9 is a drawing showing a construction of the recording/reproducing apparatus of the present invention.

Erasing of recorded information is carried out by short-circuiting the needle electrode and the transparent electrode. Furthermore, the recording/reproducing apparatus that information can be recorded in high density can be obtained by combining another opto-electric transducer element with the recording medium of the present invention. Information can be recorded analogously on the recording medium by using electric signals which are obtained by changing the information to electric signals with a opto-electric transducer and are applied to the recording medium. As such opto-electric transducers, there are a laminate of a charge injection layer of selenium film, etc. and a ferroelectric polymer of polyvinylidene fluoride, etc. or a combination of a photo diode and a direct current power supply. About the former, as described in Japan Society of Polymer Science preprints, vol. 39, Page 1135 (1990), an open circuit voltage of more than 100V is observed when irradiating light to the laminate. By applying this photo-voltage to the recording medium of the present invention, recording and reproducing of light signals can be performed. For example, as shown in FIG. 9, an amount of light irradiation of the first light source is controlled in accordance with input recording information.

Photo-voltage generated in the charge injection film upon light irradiation is applied to the film containing the charge generating material to record the information. When reading out recorded information, light is irradiated from the second light source to the film containing the charge generating material. The photo-current which is generated by light irradiation from the second light source is detected to reproduce the recorded information. If electrodes are short-circuited, the recorded information is erased. Because an surface area of the recording medium is made large easily, the recording medium can be used as photo detectors for copying machines and scanners.

DETAILED DESCRIPTION OF THE PREFERRED EMBODIMENTS

In the following, examples of the present invention are explained in detail. Examples 1–3 are explained with reference to FIG. 1.

EXAMPLE 1

According to the prescription disclosed in Japanese Patent Publication No. 3-56470 bulletin, $\tau$ type metal free phthalocyanine was obtained. 0.2 g of $\tau$ type metal free phthalocyanine was added to 14.5 g of tetrahydrofuran, then grinding and dispersing processes were conducted for 5 hours by a ball mill.

Subsequently, to this dispersion liquid was added 25.3 g of silicone resin (KR-5240, made by Shin-Etsu Kagaku), and dispersing processing was conducted by ultra sonic wave to prepare a coating solution. Referring to FIG. 1, ITO thin film 12 was made on a glass substrate 11 by a spattering method to form a transparent electrode (seat resistivity 100 $\Omega/\square$). On this transparent electrode 12, an SiOx thin film 13 was formed to be a thickness of 150–200 nm by a vacuum deposition method. Coating 14 was made using the above coating solution by a spin-coater (1H-2 made by Mikasa Semiconductor Co.) on the SiOx thin film 13. This coating film 14 was dried for 1 hour at 140° C. The thickness of the coating film 14 was approximately 5 μm. An aluminum electrode 15 was formed on this coating film by a vacuum deposition method to prepare a sample cell of sandwich type.

EXAMPLE 2

According to the prescription disclosed in Japanese Patent Laid-open Print No. 62-256866 bulletin, titanyl phthalocyanine was obtained. Referring to FIG. 1, an ITO thin film 12 was made on a glass substrate 11 by a spattering method to form a transparent electrode 12 (seat resistivity 100 Ω/□). On this transparent electrode 12, an SiOx thin film 13 was formed to be a thickness of 150–200 nm by a vacuum deposition method.

On this SiOx thin film 13 was vacuum deposited titanyl phthalocyanine by resistance heating in vacuum of $6-7 \times 10^{-6}$ Torr. A thickness of this evaporation film 14 was approximately 150 nm. Measurement of film thickness was conducted by means of a sensing pin type film thickness indicator (ULVAC DEKTAK-3030). This evaporation film was let alone for approximately 14 hours on a Petri dish which tetrahydrofuran was put in. A crystal growth processing of titanyl phthalocyanine evaporation film was carried out. X ray diffraction spectrum of processed titanyl phthalocyanine evaporation film was measured. From the facts that values of 2θ of X rays diffraction spectrum existed at diffraction peaks of 12.7°, 25.4° and 28.6°, it was found that this titanyl phthalocyanine evaporation film was crystal type of a type. As aluminum electrode 15 was formed on this evaporation film by a vacuum deposition method to prepare a sample cell of sandwich type.

EXAMPLE 3

Also referring to FIG. 1, an ITO thin film 12 was made on a glass substrate 11 by a spattering method to form a transparent electrode (seat resistivity 100 Ω/□). On this transparent electrode 12 was formed an SiOx thin film 13 of a thickness of 150–200 nm by a vacuum deposition method. Next, selenium (made by Wako Chemical Co.) was vacuum deposited on this SiOx thin film 13 by means of a resistor heating in vacuum of $6-7 \times 10^{-6}$ Torr. The film thickness of selenium 14 was approximately 5 μm. An aluminum electrode 15 was formed on selenium film by a vacuum deposition method to prepare a sample cell of sandwich type.

EXAMPLE 4

In the similar manner as in Example 2, an SiOx thin film, an alpha type titanyl phthalocyanine film, an SiOx thin film and an aluminum electrode were formed successively on ITO electrode 12 to obtain a sample cell of sandwich type. A thickness of SiOx thin film of this sample cell and titanyl phthalocyanine film was done to sample cell and same a thickness of Example 2.

EXAMPLE 5

Figure 2:
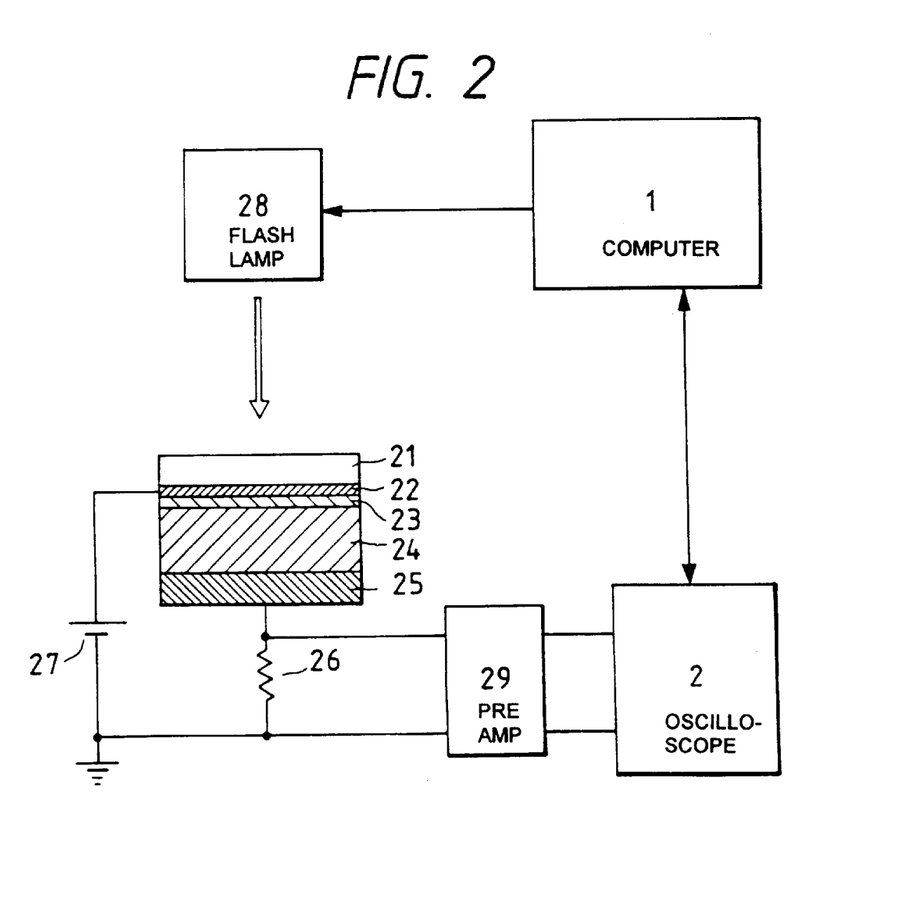
FIG. 2 is a drawing showing an evaluation system of the recording/reproducing method of the present invention.

Evaluation of the recording/reproducing method of the present invention was carried out by measurement of photo-current. An evaluation system is shown in FIG. 2. An external direct current power supply was connected to an ITO electrode 22 and aluminum counter electrode 25. A resistor 26 of 100 kΩ was inserted between the aluminum counter electrode 25 and earth, and an electric potential change produced by photo-current flowing through resistor 26 was measured by an oscilloscope 2 (2430 A made by Tektronix Co.) through a pre-amplifier 29 (mode 113 made by Pearl Co.). As a light source, a xenon flash lamp 28 (L2359 made by Hamatusu Photonics Co., pulse width of 1 μs) was used. A computer 1 is connected to xenon flash lamp 28 and oscilloscope 2. Computer 1 controls the measurement system of FIG. 2. Specifically, computer 1 generates trigger signals for xenon flash lamp 28 and oscilloscope 2 and places a delay between the two trigger signals. And, a light pulse of 1 Hz was irradiated to the sample cell and photo-current was measured repeatedly.

Figure 3:
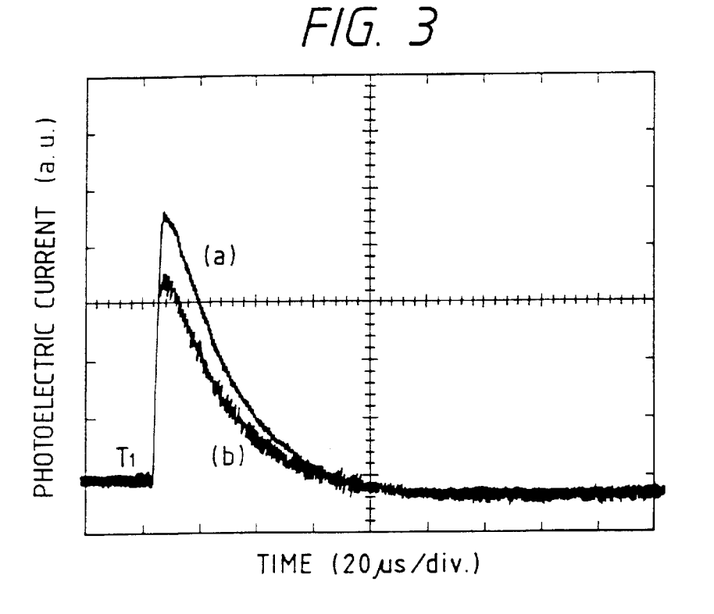
FIG. 3 is a drawing showing the performance effect of the sample cell of Example 1.

Measurement results of the sample cell of Example 1 are shown in FIG. 3. During recording (Programming), a voltage 12 of +100v was applied by voltage source 16 for 1 second to the ITO electrode 12 of the sample cell and application was stopped without stepping voltage to 0V. (See FIG. 1(1)). Subsequently, during reproducing (data readout), the photo-current waveform shown in FIG. 3 (a) was detected by photo-current detector 18 (which is connected to load resistor 17) when a light pulse was irradiated to the sample cell. (See FIG. 1 (2)). When pulsed light was irradiated to the sample cell 12 in succession sequentially, the photo-current of the waveform which was substantially equal to that of FIG. 3 (a) was observed. When pulsed light was irradiated successively further, intensity of photo-current decreased gradually. Waveforms of photo-current observed after 2000 times of irradiation of pulsed light are shown in FIG. 3 (b). Intensity of waveforms of FIG. 3 (b) was approximately 75% of the initial stage. Even if the cell was exposed to pulsed light, photo-current could be observed. This result agreed with the number of reproduction which is obtained by expectation from the quantity q of carriers generated by one time exposure (2 pC which is obtained by integration of photo-current waveform) and a quantity Q of charges accumulated in the cell (40 nC which is obtained from eq. 1). Under this condition, approximately 20000 times of photo-current were observed by one voltage application.

Accordingly if voltage application is regarded as recording (or programming) of signals and observation of photo-current is regarded as reading out, recorded information can be read out approximately 20000 times where information was written in once in the sample cell of Example 1.

Photo-current was not observed when electrodes of the sample cell were short-circuited after voltage was applied to write in information, even if light was irradiated to the sample cell. Accordingly, as shown in FIG. 1(3) recording was erased by short-circuiting electrodes of the sample cell.

Figure 4:
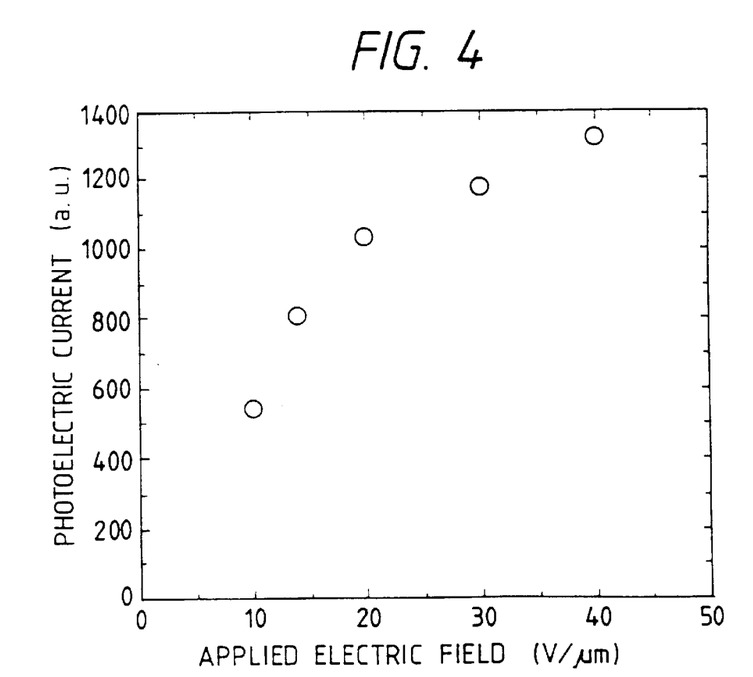
FIG. 4 is a drawing showing the relationship between applied voltage and photo-current intensity of the sample cell of Example 1.

The relationship between the voltage which was applied to the sample cell in writing of information and photo-current which was generated when light was irradiated to the sample cell during reading out is shown in FIG. 4. From FIG. 4, it is apparent that photo-current greatly varies with applied voltage. Accordingly, it is understood that information can be recorded in analog when applied voltages corresponding to recording information are predetermined. And, it is also apparent that not only conventional binary recording is recorded, but recording of high orders is possible. If recording is performed after threshold values for digitizing analog signals are predetermined, recording and reproducing of digital signals are possible.

EXAMPLE 6

In case of sample cells of Examples 2,3 and 4, same as a case of sample cell of Example 1, photo-current was observed repeatedly during read out when pulsed light was repeatedly irradiated after voltage application. Values Q when an electric field of 20V/μm is applied to the sample cell, values q of the initial stage and the reading out number of Examples 1 to 4 are shown in Table 1.

TABLE 1

| Example | dielectric constant | Q (NC) | max. (pC) | read out number (times) |
|---------|---------------------|--------|-----------|--------------------------|
| Ex. 1   | 3.4                 | 40     | 2         | to 20000                 |
| Ex. 2   | 4.2                 | 49     | 8         | to 4000                  |
| Ex. 3   | 6.3                 | 74     | 12        | to 6000                  |
| Ex. 4   | 4.2                 | 49     | 8         | to 5500                  |

A dielectric constant of each sample cell in Table 1 was measured by a low frequency bridge method. Photo-current of more than 3000 times was repeatedly observed. In case of the sample cells of Examples 2 and 3, the actual reading out number of times was smaller than the calculated number of reading out times expected by Q/q. The reason of this is that these samples are of high electrical conductivity and stored charges dissipate to some extent in dark places. In case of the sample cell of Example 4 in which both sides of titanyl phthalocyanine evaporation film were sandwiched between SiOx isolation films, the actual reading out number of times is larger than the sample cell of Example 2 wherein an SiOx isolation film was put on one side of the titanyl phthalocyanine evaporation film.

Accordingly, placing isolation films on both sides of the film containing charge generating material is effective to increase the number of reproducing (reading out) times.

EXAMPLE 7

To examine overwrite facility, the tests which repeated voltage application to the sample cell, measurement of photo-current and short-circuit of electrodes were carried out by 10000 times. The sample cells of Examples 1, 2, 3 and 4 kept photo-current intensity of more than 90% of the initial value. In the recording/reproducing method of the present invention, the film material containing charge generating material repeat charging and discharging of a small quantity of charges. For this reason, it is thought that since there is no by-reaction that may deteriorate the films, the great number of reading times is achieved.

EXAMPLE 8

According to the prescription disclosed in Japanese Patent Publication No. 3-56470 bulletin, τ type metal free phthalocyanine was prepared. 0.2 g of the resulting τ type metal free phthalocyanine was prepared. 0.2 g of the resulting τ type metal free phthalocyanine was added to 14.5 g of tetrahydrofuran and was ground and dispersed for 5 hours in a ball mill. 25.3 g of silicone resin (KR-5240 made by Shin-Etsu Kagaku Co.) was added to this dispersion liquid and ultra sonic wave was irradiated and dispersing processing was carried out to prepare a coating solution.

Figure 5:
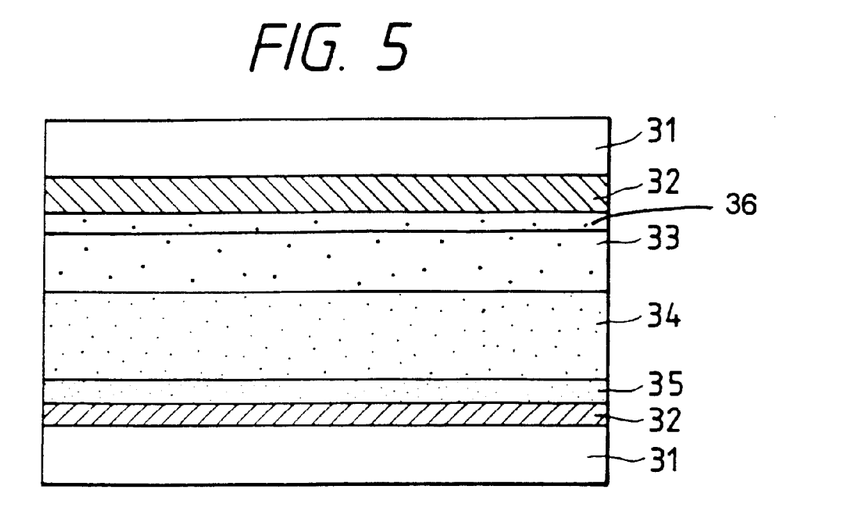
FIG. 5 is a drawing showing a construction of the sample cell of Example 8.

As shown in FIG. 5, an ITO thin film 32 was made on a glass substrate 31 by a sputtering method to form a transparent electrode (seat resistivity 100 Ω/□). On this transparent electrode 32 was formed an SiOx thin film 35 of a thickness of 150–200 nm by a vacuum deposition method. On this SiOx thin film 35 was formed the phthalocyanine coating solution which was coated by a spin-coater (1H-2 made by Mikasa Semiconductor Co.). This phthalocyanine coating film 34 was dried for 1 hour at 140° C. A thickness of this coating film 34 was approximately 5 μm. On this coating film 34, the coating solution which was prepared by dissolving vinylidene fluoride-tetrafluoroethylene copolymer (made by Daikin Industries, Ltd. at a mole ratio of 4:1) in acetone and was coated by the spin coater. A thickness of the vinylidene fluoride tetrafluoroethylene copolymer film 33 was approximately 3 μm.

A poling processing of the film was conducted under the condition that a voltage of high electric field (approximately 150V/μm) was applied to the film for 10 minutes at 130° C. On the poling processed film, a selenium film 36 was deposited from selenium (made by Wako Chemical) by vacuum deposition under the Condition of vacuum degree of $6-7 \times 10^{-6}$ Torr. The thickness of selenium film 36 was approximately 0.5 μm. On the selenium evaporation film 36 was pressed a glass substrate 31 having another ITO electrode 32 so that the ITO electrode 32 is adhered to the selenium film 36 to form a sandwich type sample cell. The diagram of the cell is shown in FIG. 5.

After the ITO electrodes 32 of the sample were connected, white pulsed light of xenon flash lamp (L2359 made by Hamamatsu Photonics Co., pulse width of 1 μs.) as light signals was irradiated to the selenium evaporation film 36. Subsequently, the ITO electrodes 32 were open-circuited, a resistor of 100 kΩ was inserted between the ITO electrode of phthalocyanine dispersion film side and earth electrode. White pulsed light was irradiated from the phthalocyanine dispersion film side in place which is the same location of light irradiation to the selenium evaporation film 36, and photo-current was measured.

Photo-current observed was approximately 5 nA. On the other hand, photo-current was not observed when white pulsed light was irradiated from the phthalocyanine dispersion film side in location which is different from the irradiation to the selenium evaporation film 36. Accordingly, recording and reproducing is possible by this sandwich type sample cell.

EXAMPLE 9

Figure 6:
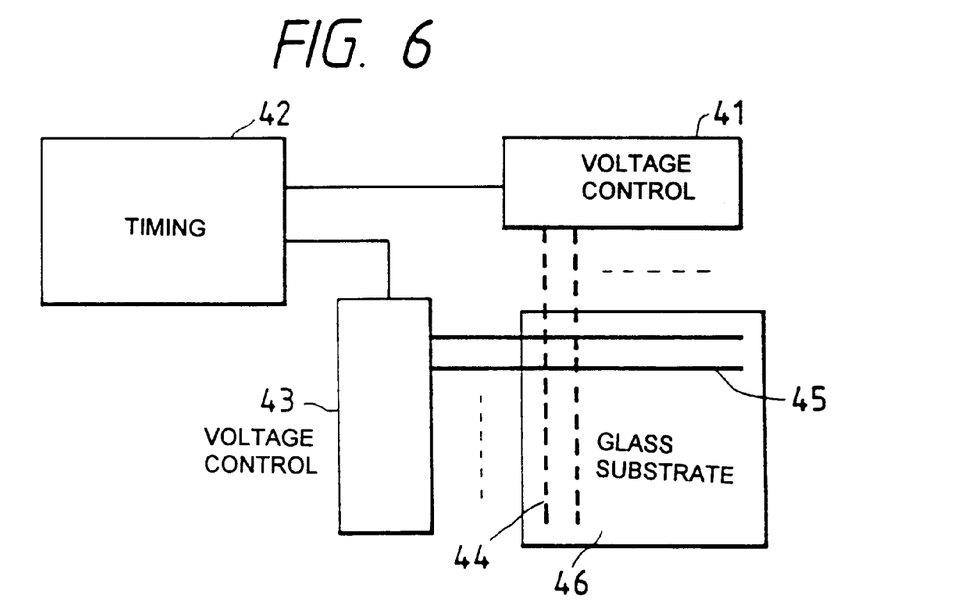
FIG. 6 is a drawing showing a construction of the sample cell of Example 9.

Referring to FIG. 6, ITO electrodes 44 of 1 mm wide, 3 cm is long were made in 1 mm spacing on glass substrate 46. On the ITO electrodes 44, SiOx thin film was formed to a thickness of 150–200 nm by vacuum deposition method. On this SiOx thin film was formed a dispersion film of τ type metal free phthalocyanine minute particle under the same condition as Example 1, except that an amount of tetrahydrofuran was set up as 17.5 g. The thickness of a film where minute particles of τ type metal free phthalocyanine are dispersed was approximately 1 μm. After the coating having dried for an hour at 140° C. dispersion film of this τ type metal free phthalocyanine minute particles 15 of stripe form aluminum electrodes 45 of 1 mm wide, 3 cm long were made in spacing of 1 mm to intersect with ITO electrodes 44, and were laminated on the dispersion film of τ mode metal free phthalocyanine minute particles. The ITO electrodes 44 and aluminum electrodes 45 were used for driving the cell as 15×15 matrix electrodes. The construction is shown in FIG. 6. A voltage of 20V was applied between 10 of the ITO electrodes 44 (as positive electrodes) and aluminum electrodes 45, successively. A voltage control circuit 41 controls the voltage applied to ITO electrodes 44. A voltage control circuit 43 controls the voltage applied to the aluminum electrodes 45. A timing circuit 42 is connected to voltage control circuits 41 and 43. Timing circuit 42 controls the timing of voltages applied to electrodes 44 and 45.

Subsequently, to parts where ITO electrodes 44 and aluminum electrodes 45 overlap, white pulsed light of xenon flash lamp (L2359, made by Hamamiatsu Photonics Co., pulse width of 1 μs) was irradiated from the ITO electrode side through apertures of a diameter of 0.5 mm. The photo-current which flows through a resistor of 100 kΩ inserted between aluminum electrode 45 and earth electrode was observed with an oscilloscope. Before light irradiation (corresponding to read out process), a voltage was applied to the part of the cell where electrodes 44 and 45 overlap (corresponding to recording or programming process); as a result, positive photo-current was observed only when irradiated with light.

When pulsed light was irradiated repeatedly, photo-current was observed repeatedly. After 1000 times repetition of irradiation, intensity of photo-current was approximately 65% of initial intensity. When ITO electrodes 44 and aluminum electrodes 45 were short-circuited, no photo-current was observed in all points. Accordingly, the recording/reproducing method of the present invention can be realized by observing photo-current with matrix electrodes.

EXAMPLE 10

Figure 7:
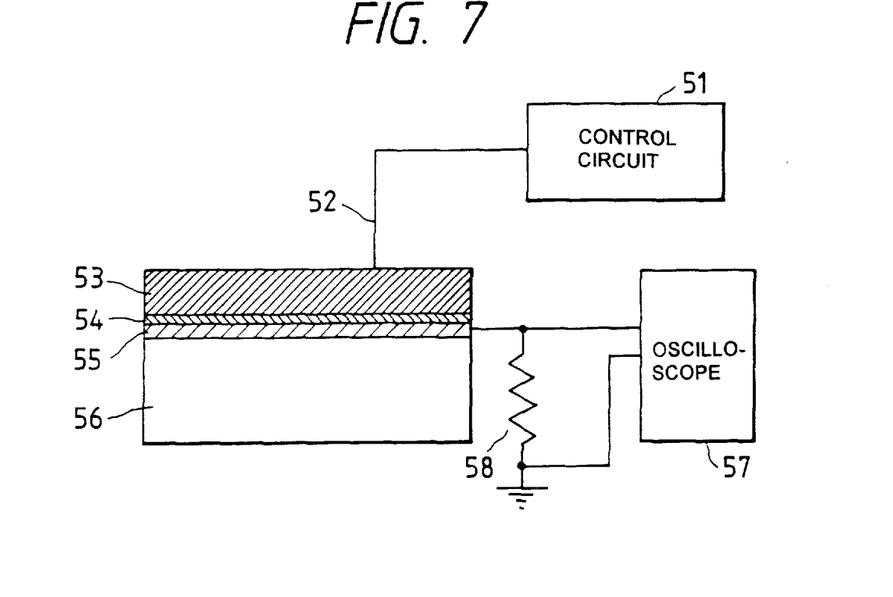
FIG. 7 is a drawing showing a construction of the sample cell of Example 10.

Referring to FIG. 7, SiO$x$ thin film 54 of a thickness of 150–200 nm was formed by a vacuum deposition method on the transparent electrode 55 of the ITO thin film by a sputtering method over the surface of a glass substrate 56 (seat resistivity of 100 Ω/□). On the SiO$x$ thin film 54, a τ type metal free phthalocyanine minute particle dispersion film 53 was made in the same condition as Example 1, except that an amount of tetrahydrofuran was set up as 17.5 g. The dispersion film of τ type metal free phthalocyanine minute particles was dried at 140° C. for an hour to form the dispersion film of approximately 1 μm. A needle electrode 52 having a diameter of approximately 100 μm at the tip was touched to the face of τ type metal free phthalocyanine minute particle dispersion film 53.

After a voltage of –30V was applied for 1 second to needle electrode 52 by control circuit 51, needle electrode 52 was separated from the face of the sample film. Subsequently, white pulsed light of a xenon flash lamp (L235 9, made by Hamamatsu Photonics Co., pulse width of 1 μms) was irradiated to the dispersion film 53 (at the points where voltage was applied) from the ITO electrode side through apertures of a diameter of 0.5 mm. Photo-current flowing though a resistor 58 between the ITO electrode 55 and earth was observed with an oscilloscope 57. The construction is shown in FIG. 7. As a result, negative photo-current was observed when light was irradiated. When pulsed light was irradiated repeatedly, photo-current was observed repeatedly. The intensity of photo-current was observed repeatedly. The intensity of photo-current was approximately 60% of the initial intensity, after repeated irradiation of pulsed light of 500 times. The part of the sample film to which voltage was applied was contacted with the needle electrode 52 to short-circuit the ITO electrodes and the needle electrode 52. Even if light was irradiated to the short-circuited points, photo-current was not observed.

Referring to FIG. 8, a sample cell is shown including a glass substrate 11, an ITO thin film 12 to form an electrode, an SiO$x$ thin film 13, a coating film 14 containing photo-conductive material, and an aluminum electrode 15.

During recording (programming) of the sample cell of FIG. 8, data to be recorded is applied by information data input circuit 62 to voltage control circuit 61. A voltage provided by voltage source 16 is applied by voltage control circuit 61 through switch 60a to ITO thin film 12 to record the data. During data recording (programming), switch 63 and switch 60b are open, while switch 60a is closed. Stored data can be erased by opening switches 60a and 60b, and closing switch 63. To erase stored data, switch 63 is closed to short-circuit ITO thin film 12 and electrode 15. Data can be reproduced (read out) by irradiating the sample cell with light from light source 59. During the data read out process, switch 63 is open and switch 60b is closed and photo-current is detected by photo-current detector 18 as the voltage drop across resistor 17. An information data output circuit 64 receives and stores the reproduced data based on the detected photo-current.

Referring to FIG. 9, a sample cell is shown which is the same as the sample cell shown in FIG. 5. The sample cell of FIG. 9 includes a glass substrate 31, ITO thin films 32, SiO$x$ thin film 35, phthalocyanine film 34 (a charge generating material), a vinylidene fluoride tetrafluoroethylene copolymer film 33, and a selenium film 36. Vinylidene fluoride tetrafluoroethylene copolymer film 33 and selenium 36 operate as a charge injecting layer. A first light source 65 for programming or recording is coupled to electric potential source 68 via switch 60a. Information data input circuit 62 provides data to be recorded to voltage control circuit 61. Programming of the sample cell is achieved by first light source 65 irradiating light onto the selenium film 36 of the sample cell. The amount of light irradiation of the first light source 65 is controlled in accordance with input recording information from information data input circuit 62. The resulting photo-voltage generated by the charge injecting layer upon light irradiation is applied to phthalocyanine film 34 containing the charge generating material to record the data (charges) in film 34. In particular, charge carriers are initially generated in a selenium film 36, and these charge carriers influence (change) the orientations of molecules of vinylidene fluoride tetrafluoroethylene copolymer film 33. Eventually, a large voltage is applied to film 34. Switch 63 may be closed to short circuit both ITO thin films 32 to erase the programmed cell.

To reproduce or read out data from the cell of FIG. 9, switch 63 is open and switch 60b is closed. For data read out, film 34 is irradiated by second light source 66. The photo-current produced in film 34 is detected by photo-current detector 18 by measuring the voltage drop across resistor 17. Information data input circuit 64 receives and stores the data from detector 18 based on the detected photo-current.

According to the present invention, it is possible to provide rewritable storage elements and image pick-up elements with high density in a simple and easy method.

What is claimed is:

1. A recording/reproducing method which comprises:
applying a voltage of intensity corresponding to information to be recorded to a recording medium comprising a film containing a charge generating material sandwiched between two electrodes so that electric charges are accumulated in the recording medium and the information is recorded;
   irradiating light to the recording medium to convert the stored charges into photo-current thereby to read the recorded information; and
   short-circuiting the electrodes to erase the information.

2. An information recording and reproducing apparatus which comprises:
   a. recording information input means;
   b. a recording medium which has a photo-electric conversion film sandwiched between two electrodes;
   c. light irradiation means for irradiating light to the recording medium;

d. photo-current detection means for detecting a photo-current generated from the recording medium upon light irradiation;

e. power supply means for applying voltage to the recording medium;

f. short-circuit means for canceling a charge stored in the recording medium to erase the information recorded in said recording medium;

h. output means for reproducing an output of the photo-current detection means; and I. switching means that connects the photo-current detection means and the power supply means to the recording medium according to information reproducing and recording.

3. An information recording apparatus which comprises:

a. recorded information input means;

b. a recording medium which has a laminate of a first film containing a charge generating material and a second film of a charge injecting material, the laminate being sandwiched between a pair of transparent electrodes;

c. first light irradiation means that irradiates light to the second film;

d. second light irradiation means which irradiates light to the first film;

e. photo-current detection means which detects photo current produced in the recording medium upon light irradiation by second light irradiation means.

f. power supply means which applies voltage to the first light irradiation means;

g. short-circuit means which erases the charges accumulated in the recording medium by short-circuiting the electrodes;

h. voltage control means which controls voltage of the power supply means in accordance with recording information;

I. output means which reproduces an output of the photo-current detection means; and j. switching means for connecting the photo-current detection means and voltage control means to the recording medium according to information reproducing and recording.

* * * * *

UNITED STATES PATENT AND TRADEMARK OFFICE
CERTIFICATE OF CORRECTION

PATENT NO. : 5,898,607  Page 1 of 2
DATED : April 27, 1999
INVENTOR(S) : Toshiro SAITO, et al It is certified that error appears in the above-identified patent and that said Letters Patent is hereby corrected as shown below:

| Column | Line | |
|---|---|---|
| 1 | 21 | After "information" insert --.--. |
| 1 | 46 | After "recording" delete "a". |
| 3 | 17 | Change "electricity" to --electric--. |
| 3 | 53 | Change "and" to --then--. |
| 3 | 58 | Before "site" delete "a". |
| 3 | 61 | Change "is" to --are--. |
| 4 | 32 | Change "charges" to --charge--. |
| 5 | 12 | Change "carries" to --carriers--. |
| 5 | 19 | Change "it" to --if--. |
| 5 | 60 | After "with" change "a" to --an--. |
| 5 | 54 | Change "that" to --wherein--. |
| 6 | 15 | After "Because" change "an" to --a--. |

UNITED STATES PATENT AND TRADEMARK OFFICE
CERTIFICATE OF CORRECTION

PATENT NO.   : 5,898,607
DATED        : April 27, 1999
INVENTOR(S)  : Toshiro SAITO, et al It is certified that error appears in the above-identified patent and that said Letters Patent is hereby corrected as shown below:

| Column | Line | |
|---|---|---|
| 7 | 30 | Change "a type" to --α type--; change "As" to --An--. |
| 7 | 37 | Change "spattering" to --sputtering--. |
| 7 | 54 | Change "done" to --formed--; change "and same a" to --at the same--. |
| 10 | 11 | Change "Condition" to --condition--. |
| 10 | 40 | After "cm" delete --is--. |
| 13 | 10 | Change "change "h." to --g.--. |
| 13 | 12 | Change "I." to --h.--. |
| 14 | 16 | Change "I." to --i.--. |

Signed and Sealed this

Eighteenth Day of July, 2000

Attest:

Attesting Officer

Q. TODD DICKINSON

Director of Patents and Trademarks